(12) United States Patent
Takebayashi

(10) Patent No.: US 6,884,190 B2
(45) Date of Patent: Apr. 26, 2005

(54) BICYCLE SHIFT CONTROL DEVICE THAT INHIBITS THE GENERATION OF A SECOND SHIFT SIGNAL AFTER THE GENERATION OF A FIRST SHIFT SIGNAL

(75) Inventor: Haruyuki Takebayashi, Yao (JP)

(73) Assignee: Shimano, Inc., Sakai (JP)

(*) Notice: Subject to any disclaimer, the term of this patent is extended or adjusted under 35 U.S.C. 154(b) by 287 days.

(21) Appl. No.: 10/091,751

(22) Filed: Mar. 5, 2002

(65) Prior Publication Data

US 2002/0128097 A1 Sep. 12, 2002

(30) Foreign Application Priority Data

Mar. 7, 2001 (JP) .......................................... 2001-063500

(51) Int. Cl.$^7$ ................................................ F16H 7/00
(52) U.S. Cl. ............................ 474/78; 474/70; 701/55; 701/56; 701/95
(58) Field of Search .................... 701/55, 56, 95; 474/78, 70, 8

(56) References Cited

U.S. PATENT DOCUMENTS 6,047,230 A * 4/2000 Spencer et al. ................ 701/59
6,467,786 B1 * 10/2002 Horiuchi ........................ 701/55

FOREIGN PATENT DOCUMENTS

| JP | 7-205872 | 8/1995 |
| JP | 8-113182 | 5/1996 |
| JP | 10-159964 | 6/1998 |

* cited by examiner

*Primary Examiner*—Marcus Charles
*Assistant Examiner*—Bradley J. Van Pelt
(74) *Attorney, Agent, or Firm*—James A. Deland

(57) ABSTRACT

A bicycle shift control device includes a shift signal output unit for outputting shift signals and an inhibiting unit operatively coupled to the shift signal output unit for inhibiting the output of a second shift signal after the output of a first shift signal. In a more specific embodiment, the inhibiting unit inhibits the output of the second shift signal for a predetermined standby time after the output of the first shift signal.

24 Claims, 9 Drawing Sheets

BICYCLE SHIFT CONTROL DEVICE THAT INHIBITS THE GENERATION OF A SECOND SHIFT SIGNAL AFTER THE GENERATION OF A FIRST SHIFT SIGNAL

BACKGROUND OF THE INVENTION

The present invention is directed to bicycles and, more particularly, to a bicycle shift control device that inhibits the generation of a second shift signal after the generation of a first shift signal.

In current practice, shifting devices capable of shifting gears electrically or hydraulically are mounted on bicycles. For example, a motor-actuated shifting device is disclosed in JP (Kokai) 8-113182 as an externally mounted shifting device comprising a derailleur and a plurality of sprockets, each sprocket being provided with a different number of teeth and being mounted on the rear wheel. With such shifting devices, and with externally mounted shifting devices such as derailleurs in particular, a chain is moved by the derailleur to one of a large number of sprockets. Such shifting devices provide automatic shifting based on bicycle speed and/or manual shifting based on the manual manipulation of one or more shift control members. A shift signal is generated and output in accordance with the bicycle speed or the manual shifting action, and the motor-actuated derailleur is operated in accordance with the output shift signal.

To allow the chain to move smoothly, promptly, and reliably to any of the sprockets, the sprockets sometimes are provided with special shifting teeth that facilitate the movement of the chain from one sprocket to another, and the shifting teeth of the adjacent sprockets are aligned in phase with each other. The shift signal is generated when the desired inside or outside link of the chain is in proper alignment with such a shifting tooth. In addition, smaller sprockets with a single shifting tooth are commonly provided with an odd number of teeth such that the inside and outside links of the chain alternately align with the shifting tooth with every revolution. Consequently, the shifting operation completes in the course of a single revolution of the sprocket if the shifting tooth is in proper alignment with the outside or inside link during the initial revolution. When, however, the shifting tooth is not in proper alignment with the desired link during the initial revolution, the shifting operation is not completed until another revolution is made and the appropriate link is brought into alignment with the shifting tooth. In this case, a maximum of two rotations is needed until the shifting operation is completed. Providing each sprocket with two or more shifting teeth allows shifting operations to be completed more rapidly in proportion to the number of such teeth.

With conventional devices, it is sometimes impossible to operate a shifting device in a smooth manner during rapid acceleration or deceleration or when multiple gears are shifted at one time. For example, when the brake is abruptly actuated while the bicycle moves at a high speed (and the chain engages a sprocket with a small number of teeth) during automatic shifting, the shifting device may immediately try to change to the gear that corresponds to the desired speed. Not only does the shifting device frequently try to shift multiple gears at a time, but the shifting device also may miss the desired phase-aligned shifting tooth. Such actions produce shocks and prevent the device from operating smoothly. The same problem occurs when gears are manually shifted multiple gears at a time and during rapid acceleration.

SUMMARY OF THE INVENTION

The present invention is directed to a bicycle shift control device wherein the generation of a second shift signal is inhibited after the generation of a first shift signal to prevent undesirable effects when multiple gears are changed in rapid succession. In one embodiment of the present invention, a bicycle shift control device includes a shift signal output unit for outputting shift signals and an inhibiting unit operatively coupled to the shift signal output unit for inhibiting the output of a second shift signal after the output of a first shift signal. In a more specific embodiment, the inhibiting unit inhibits the output of the second shift signal for a predetermined standby time after the output of the first shift signal. If desired, the standby time may be a function of the sensed bicycle speed. Alternatively, a revolution sensing unit may be provided for sensing revolution of a bicycle component, wherein the shift signal output unit outputs shift signals in response to signals received from the revolution sensing unit. In this case the inhibiting unit may inhibit the output of the second shift signal until the revolution sensing unit senses at least one revolution of the bicycle component after the output of the first shift signal. In yet another embodiment, the inhibiting unit may inhibit the output of the second shift signal until the revolution sensing unit senses a preferred rate of revolution of the bicycle component.

DETAILED DESCRIPTION OF THE EMBODIMENTS

Figure 1:
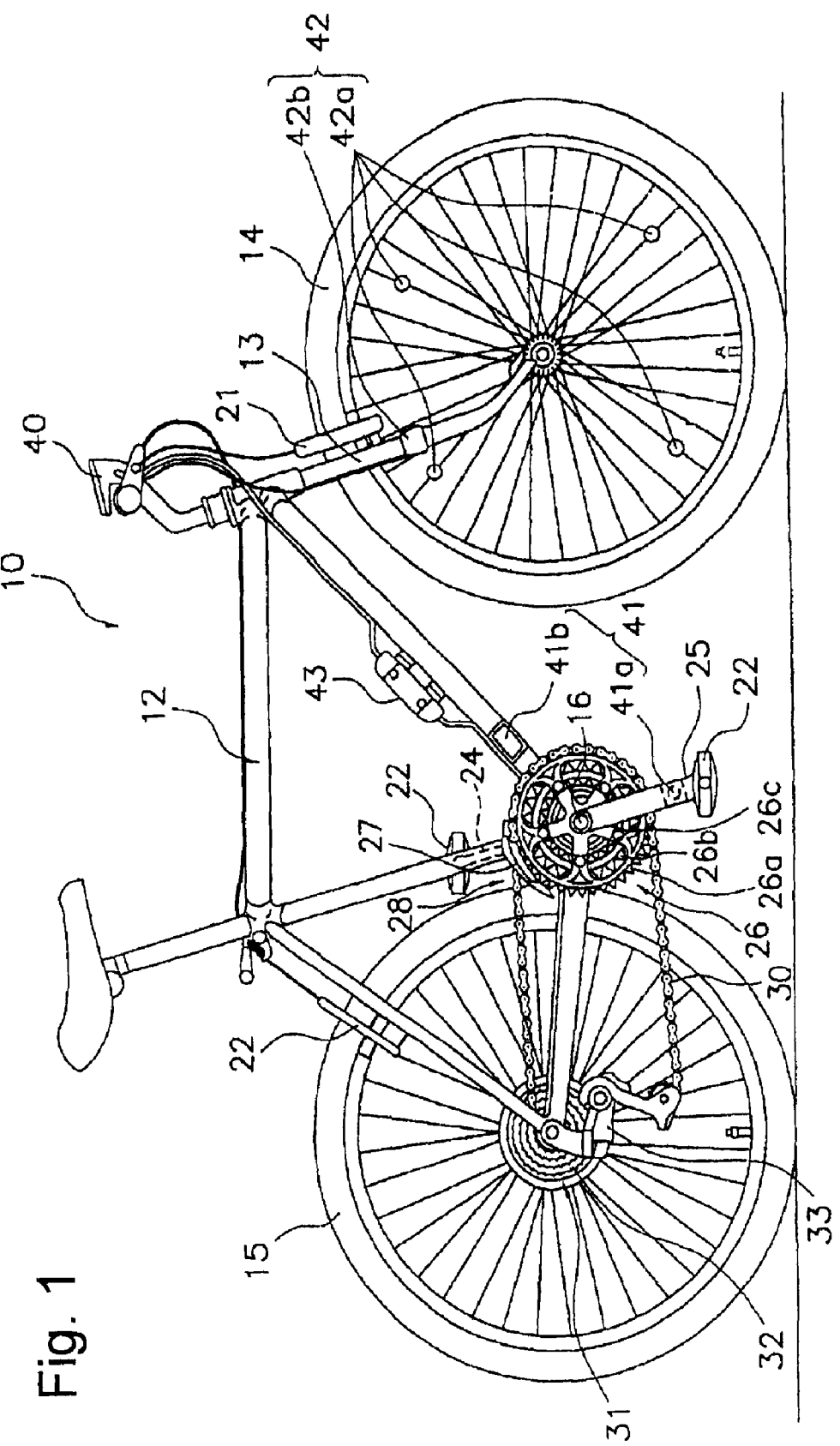
FIG. 1 is a side view of a particular embodiment of a bicycle that incorporates a particular embodiment of a bicycle shift control device according to the present invention.

FIG. 1 is a side view of a bicycle 10 that incorporates a particular embodiment of a bicycle shift control device according to the present invention. Bicycle 10 comprises a frame 12 with a front fork 13, a front wheel 14 mounted in the front fork 13, and a rear wheel 15 mounted in the rear section of the frame 12. A handlebar 17 (FIG. 2) is mounted on the front fork 13. Front and back brake levers 18a and 18b are mounted on the two ends of the handlebar 17, and front and back shift controls 19a and 19b are mounted on the inside of the brake levers 18a and 18b. The brake levers 18a and 18b are connected by brake cables 18c and 18d to front and back braking devices 21 and 22 (FIG. 1). The front and back shift controls 19a and 19b have upshifting switches 22a and 22b and downshifting switches 23a and 23b (two switches each for downshifting and upshifting). The upshifting switches 22a and 22b and the downshifting switches 23a and 23b are aligned in the circumferential direction and are disposed at locations easily reachable by the thumbs. The shift controls 19a and 19b are connected to a shift control device 40 mounted in the center of the handlebar 17.

Figure 3:
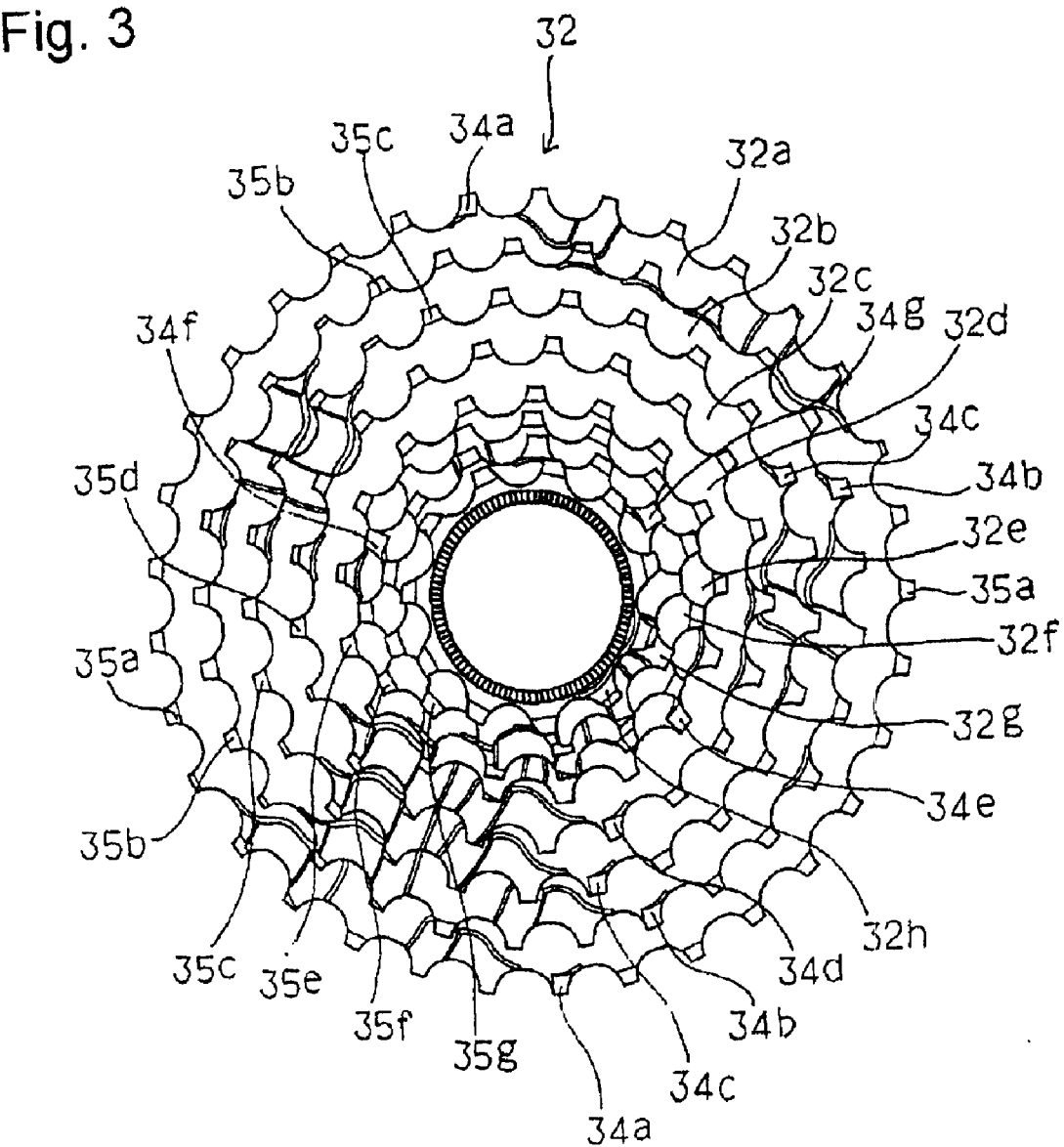
FIG. 3 is a front view of a particular embodiment of a rear sprocket cluster.

A crank spindle 16 is disposed underneath the middle section of the frame 12, and a pair of right and left crank arms 24 and 25 with pedals 22 mounted on their tips in the manner shown in FIG. 1 are nonrotatably mounted on the two ends of the crank spindle 16. A front chainwheel 26 comprising, for example, three differently sized sprockets 26a, 26b and 26c is formed integrally with the right-hand crankarm 25. A front derailleur 27 actuated by a motor, solenoid, or other actuator fixed to the frame 12 is disposed above the front chainwheel 26. The front chainwheel 26 and front derailleur 27 constitute an externally mounted front shifting device 28. A chain 30 is moved by the front derailleur 27 among the sprockets 26a, 26b and 26c. An externally mounted rear shifting device 31 is mounted on the rear wheel 15. The externally mounted rear shifting device 31 comprises a rear sprocket wheel 32 and a rear derailleur 33. As shown in FIG. 3, sprocket wheel 32 may include, for example, eight differently sized sprockets 32a–32h mounted on the rear hub of the rear wheel 15. A motor, solenoid, or some other actuator for moving the chain 30 among the sprockets 32a–32h of the rear sprocket wheel 32, may actuate rear derailleur 33. Shift position sensors (not shown) for sensing the positions of the speed steps are mounted on the front derailleur 27 and the rear derailleur 33.

A crank arm sensing element 41a (a magnet, for example) is mounted on the right-hand crankarm 25, and a crankarm sensor 41b (a reed switch, for example) designed to detect the passage of the crankarm sensing element 41a is fixed on the frame 12. The crankarm sensing element 41a and crankarm sensor 41b comprise a crankarm rotation sensing unit 41 for determining the rotation and rotational speed of the crankarms 24 and 25. Four speed sensing elements 42a (magnets, for example) may be mounted on the front wheel 14 at substantially the same circumference at regular intervals in the circumferential direction, and a speed sensor 42b (a reed switch, for example) is fixed on the front fork 13. The speed sensing elements 42a and the speed sensor 42b constitute a speed sensing unit 42 for determining the speed of the bicycle and the rpm of the front wheel 14.

The number of teeth on the sprockets 32a–32h maybe set to 33, 29, 25, 21, 17, 15, 13, and 11 teeth, for example. The comparatively large sprockets 32a–32c may be provided with, for example, two upshifting teeth 34a–34c at regular intervals in the circumferential direction in an arrangement in which the phases thereof are aligned with the corresponding adjacent smaller sprockets. The other four sprockets 32d–32g are provided with single shifting teeth 34d–34g in a phase-aligned arrangement. The sprockets 32a–32c may be provided with, for example, two downshifting teeth 35a–35c at regular intervals in the circumferential direction in a phase-aligned arrangement, and the other four sprockets 32d–32g are provided with single shifting teeth 35d–35g in a phase-aligned arrangement.

Figure 4:
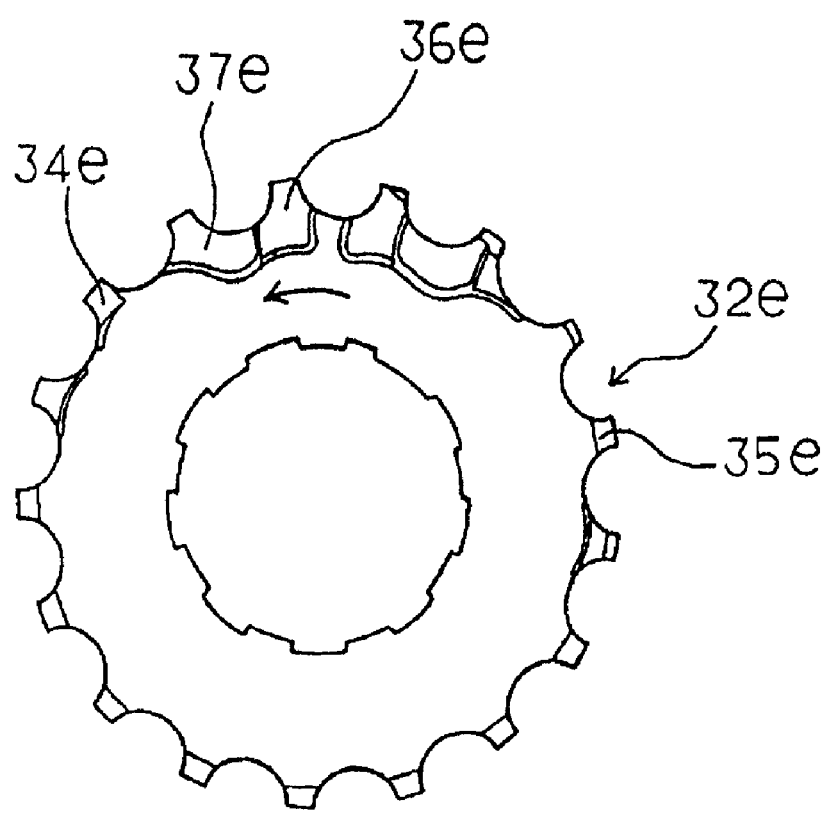
FIG. 4 is a front view of a particular embodiment of a smaller diameter sprocket.
Figure 5:
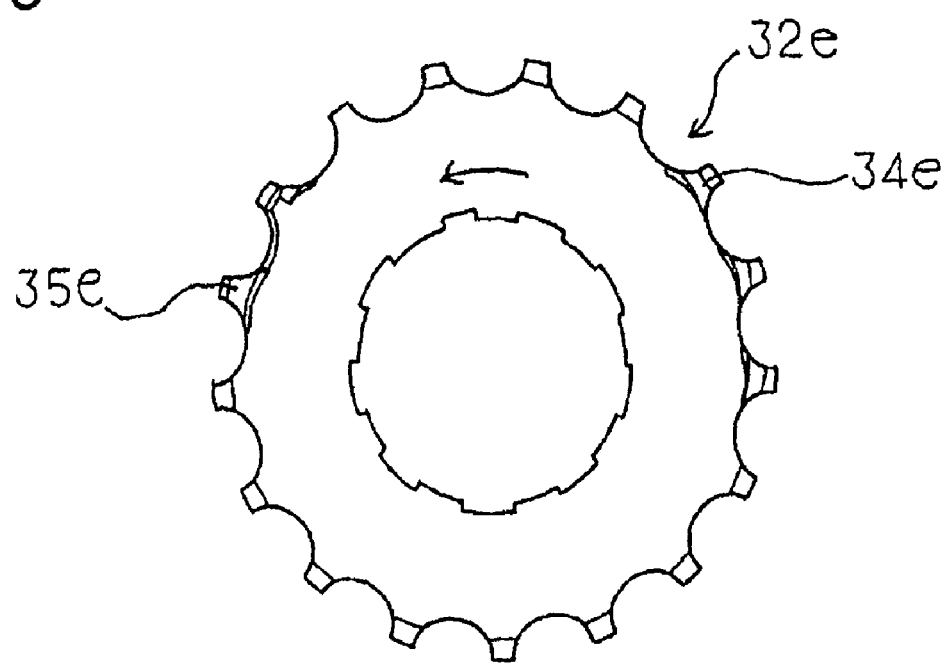
FIG. 5 is a rear view of the sprocket shown in FIG. 4.

FIG. 4 shows the sprocket 32e as viewed from the front (right side of the bicycle), and FIG. 5 shows the sprocket 32e as viewed from the back. During a downshifting operation from sprocket 32f to 32e, the derailleur 33 moves chain 30 inwardly in the direction of the hub axle and radially outwardly toward the external periphery of the sprocket 32e. A two-tier chain guide comprising recessed members 36e and 37e are formed upstream of a downshifting tooth 34e. The recessed member 37e has a greater depth than the recessed member 36e, thus forming a guide ramp toward the shifting tooth 34e. During downshifting, the side of the chain 30 is received in recessed members 36e and 37e. If an inner link of chain 30 aligns with recessed member 37e, then the subsequent outer link of chain 30 is easily engaged by the shifting tooth 34e, and the following links are received by the following downstream teeth, thus completing the gear shift. If the outer link of chain 30 aligns with recessed member 37e during the downshifting operation, then it is possible in some situations that the subsequent inner link may not be caught by shifting tooth 34e, in which case it may be necessary to allow the system to perform one more revolution so that the shifting tooth 34e may catch an outer link of chain 30. In such a case it requires two revolutions of sprocket 32e to complete the shifting operation.

During an upshifting operation from sprocket 32e to 32f, the derailleur 33 moves chain 30 outwardly in the direction of the hub axle toward the external periphery of the sprocket 32f. When the shifting tooth 35e of sprocket 32e engages the inner link of the chain 30, the following outer link is drawn toward the sprocket 32f, and the next inner link is disconnected from the sprocket 32e, thus completing the gear shift. If shifting tooth 35e of sprocket 32e engages the outer link of chain 30 during the upshifting operation, then it is possible in some situations that the chain 30 will not disengage from sprocket 32e, in which case it may be necessary to allow the system to perform one more revolution so that the shifting tooth 35e may engage an inner link of chain 30. In such a case it requires two revolutions of sprocket 32e to complete the shifting operation.

The time needed for shifting will be as follows. At a speed of 25 km/h, a 26-inch wheel will perform 3.3 revolutions per second, and the time per wheel revolution will be 0.3 s. It will therefore take 0.6 s for the wheel to perform two revolutions. The same calculations show that 0.74 s will be needed for two revolutions at 20 km/h, 1.0 s will be needed for two revolutions at 15 km/h, 1.42 s will be needed for two revolutions at 10 km/h, and 2.8 s will be needed for two revolutions at 5 km/h. A maximum wait of 2.8 s will therefore be needed for a gear shift to be completed. At low speeds, the chain 30 is often engaged by the sprockets 32a–32c, allowing a gear shift to be completed in half the time (about 1.4 s). Thus, the time needed to complete a gear shift varies with the speed but usually remains under 1.4 s as long as the speed is 10 km/h or greater.

Figure 2:
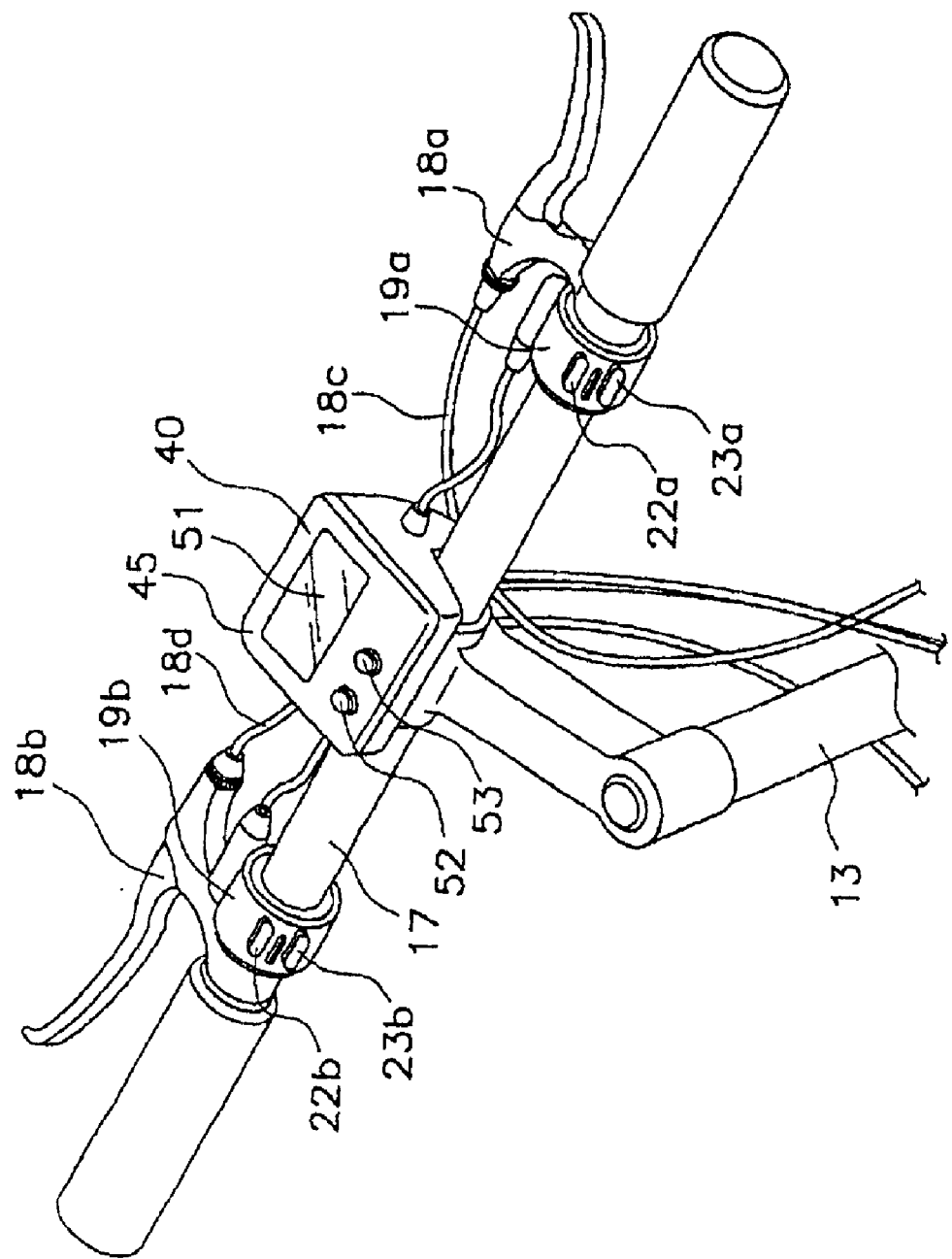
FIG. 2 is an oblique view of the handlebar assembly of the bicycle shown in FIG. 1.
Figure 6:
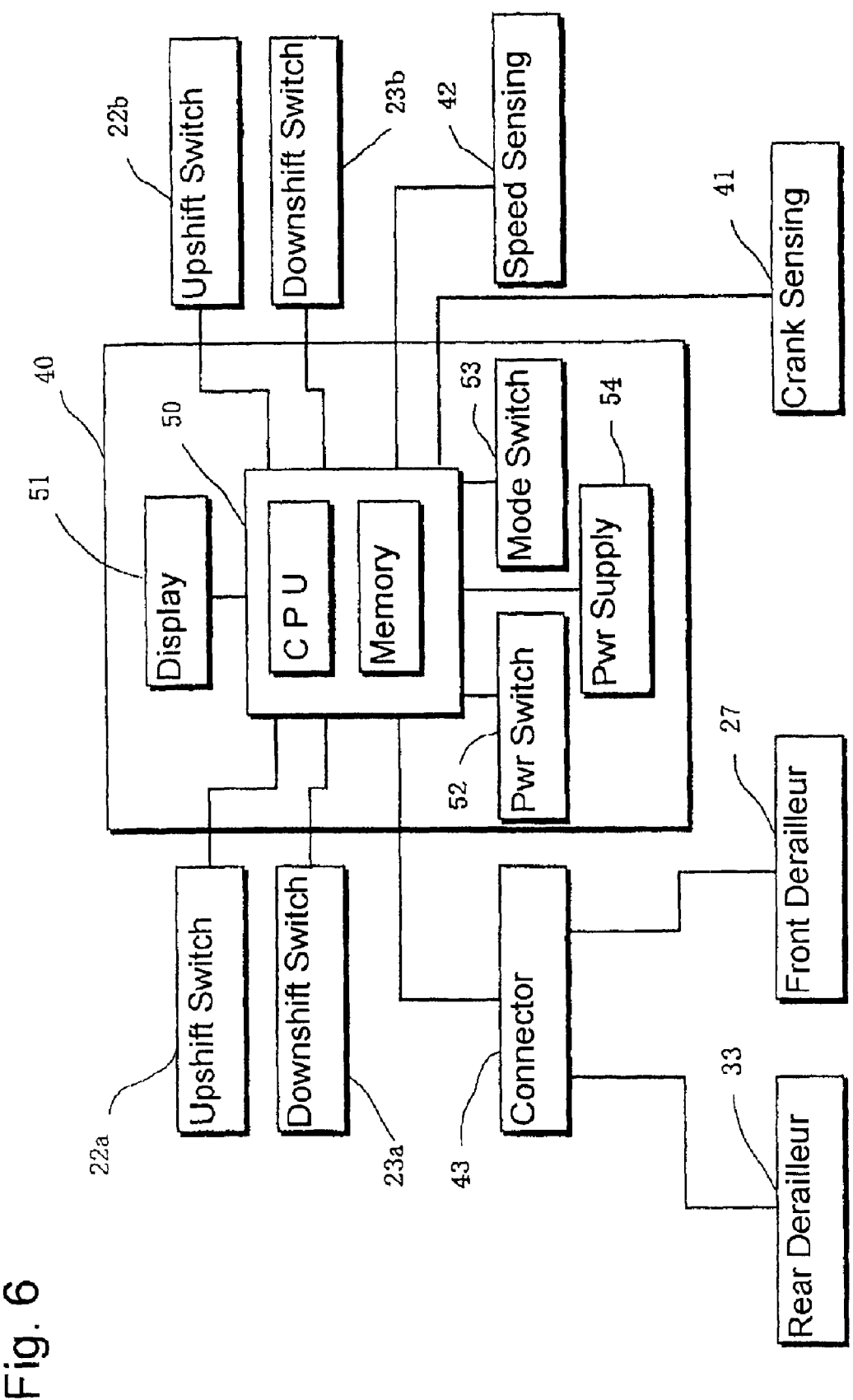
FIG. 6 is a block diagram of a particular embodiment of a shift control device according to the present invention.

As shown in FIG. 2, a shift control device 40 is housed in the control casing 45 mounted in the center of the handlebar 17. As shown in FIG. 6, the shift control device 40 comprises a control unit 50 having a CPU and a memory, a display unit 51 such as a liquid-crystal display, a power switch 52, a mode switch 53, and a power supply 54 such as a battery. Also connected to the control unit 50 are the front and back upshifting switches 22a and 22b and downshifting switches 23a and 23b, the crank arm rotation sensing unit 41, the speed sensing unit 42, and a connector 43 for connecting the front and rear derailleurs 27 and 33. As shown in FIG. 1, the connector 43 may be fixed to the down tube of the frame 12, for example. The shift positions (speed steps) SH of the front and rear derailleurs 27 and 33 are sensed by shift position sensors provided thereto, and the results are sent to the control unit 50 via the connector 43. The control unit 50 outputs shift signals to the front and rear derailleurs 27 and 33 via the connector 43 in accordance with the shifting mode selected by the mode switch 53, controls the front and rear derailleurs 27 and 33, and displays the shift condition, bicycle speed, or the like on the display unit 51. The front and rear derailleurs 27 and 33 are controlled in order to allow for smooth shifting during rapid acceleration or deceleration.

The mode switch 53 can select between an automatic shifting mode and a manual shifting mode; and between first, second, and third automatic shifting modes. The mode switch 53 switches the shifting modes in a cyclical manner, every time it is pressed, in the following sequence: manual mode, first (automatic) shifting mode, second (automatic) shifting mode, third (automatic) shifting mode, and back to manual mode. In this embodiment, the second shifting mode is for comparatively low speeds, the third shifting mode is for comparatively high speeds, and the first shifting mode is for intermediate speeds. For example, the gears are upshifted from sprocket 32b to sprocket 32c, from sprocket 32c to sprocket 32d, from sprocket 32d to sprocket 32e, from sprocket 32e to sprocket 32f, and from sprocket 32f to sprocket 32g in the first shifting mode if the speed exceeds 9 km/h, 13 km/h, 17 km/h, 21 km/h, and 25 km/h, respectively. In addition, the gears are upshifted from sprocket 32a to sprocket 32b, from sprocket 32b to sprocket 32c, from sprocket 32c to sprocket 32d, from sprocket 32d to sprocket 32e, and from sprocket 32e to sprocket 32f in the second shifting mode if the speed exceeds 9 km/h, 13 km/h, 17 km/h, 21 km/h, and 25 km/h, respectively. Finally, the gears are upshifted from sprocket 32c to sprocket 32d, from sprocket 32d to sprocket 32e, from sprocket 32e to sprocket 32f, from sprocket 32f to sprocket 32g, and from sprocket 32g to sprocket 32h in the third shifting mode if the speed exceeds 9 km/h, 13 km/h, 17 km/h, 21 km/h, and 25 km/h, respectively. Thus, in this embodiment, shifting is accomplished using six out of the possible eight sprockets (32a–32h) in an automatic shifting mode. The gears are downshifted in reverse order. In a manual shifting mode, the gears may be shifted, for example, in accordance with the number of presses of the upshifting switches 22a and 22b and downshifting switches 23a and 23b.

Figure 7:
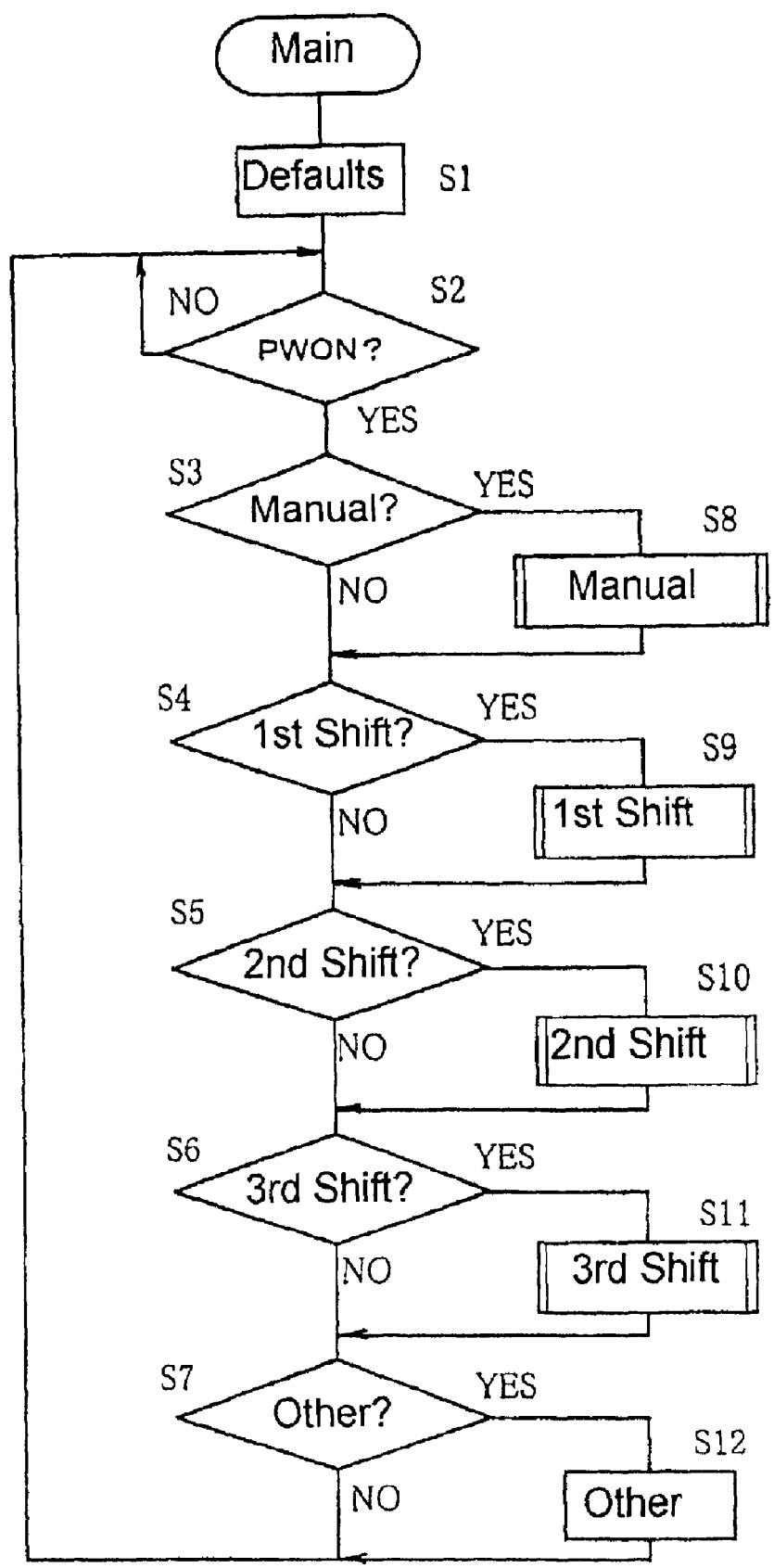
FIG. 7 is a flowchart of a particular embodiment of a main processing routine executed by the shift control device shown in FIG. 6.

FIG. 7 is a flowchart of a particular embodiment of a main processing routine executed by control unit 50. Default settings are selected in step S1, which may include the resetting of various tables and/or variables. The shift mode may be set at this time based on the setting of mode switch 53. In step S2 it is determined whether the power switch 52 is open or closed. The power switch 52 is designed to determine whether the software keeps the system on or off. Closure of the power switch 52 is awaited if the switch is open, and the operation proceeds to step S3 once the power switch 52 is closed. It is determined in step S3 whether a manual shifting mode has been selected by mode switch 53. If so, a manual shifting procedure is performed in step S8. It is determined in step S4 whether the first shifting mode has been selected by mode switch 53. If so, then a first shifting procedure is performed in step S9. It is determined in step S5 whether the second shifting mode has been selected by mode switch 53. If so, then a second shifting procedure is performed in step S10. It is determined in step S6 whether the third shifting mode has been selected by mode switch 53. If so, then a third shifting procedure is performed in step S11. Finally, it is determined in step S7 whether other procedures have been selected (as programmed by the particular embodiment). If so, then those other procedures are performed in step S12. The system returns to step S2 when these procedures are completed.

Figure 8:
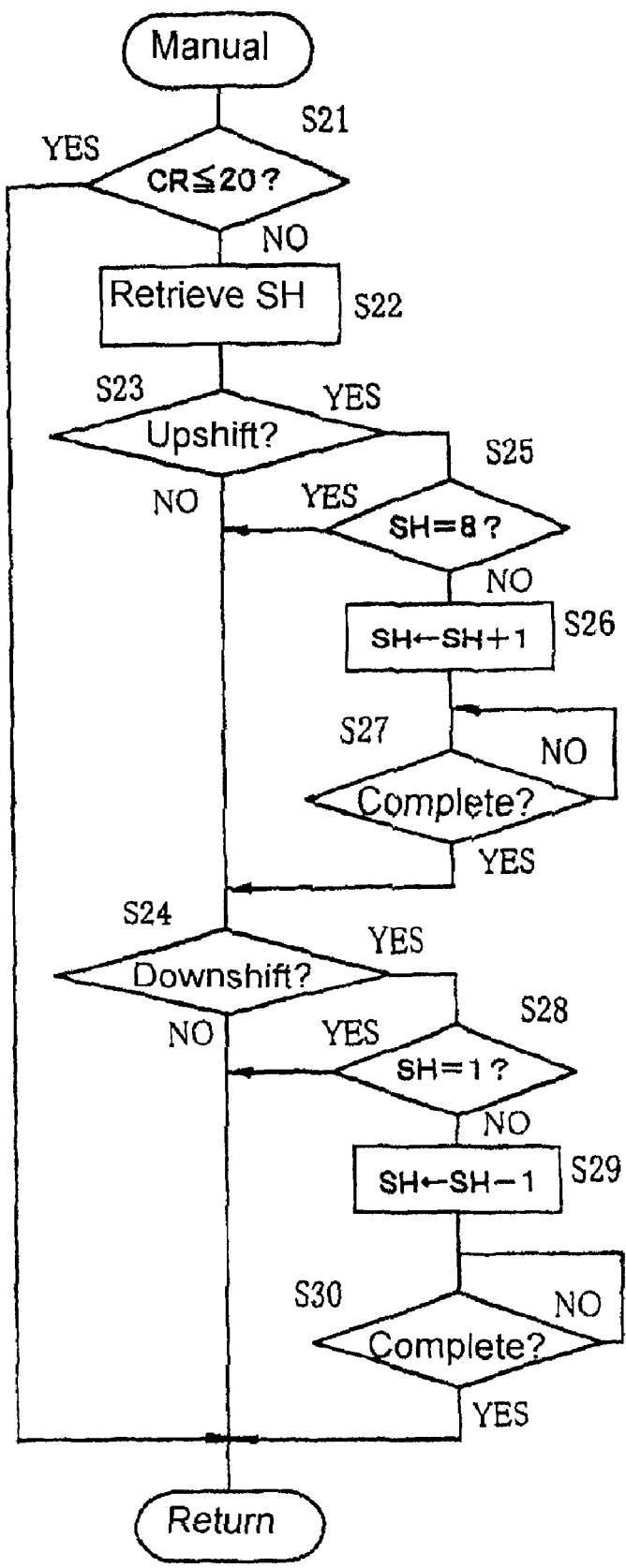
FIG. 8 is a flowchart of a particular embodiment of a manual shifting routine executed by the shift control device shown in FIG. 6.

FIG. 8 is a flowchart of a particular embodiment of a manual shifting procedure represented by step S8 in FIG. 7.

In this embodiment, it is first determined whether the crank arm rotational speed CR is at or below 20 rpm in step S21. This determination is made based on the number of pulses output by the crank arm sensor 41b of the crank arm rotation sensing unit 41 per unit of time. If so, then the system returns to the main routine without performing any procedures, since gears are difficult to shift when the crank arms 24 and 25 rotate at a low speed (that is, at a crank arm rotational speed CR of 20 rpm or less). However, if it is determined in step S21 that the crank arm rotational speed CR exceeds 20 rpm, then the data concerning the current shift position SH are retrieved from the shift position sensors provided to the rear derailleur 33 in step S22. Thereafter, in step S23 it is determined whether the upshifting switch 22a has been actuated, and in step S24 it is determined whether the downshifting switch 23a has been actuated.

If it is determined in step S23 that the upshifting switch 22a has been activated, then processing continues in step S25. It is determined in step S25 whether the shift position SH is already at "8," thus making further upshifting impossible. If so, then the operation proceeds to step S24. Otherwise, a shift signal is sent to the rear derailleur 33, the actuator of the rear derailleur 33 is set in motion, and the shift position is moved one step up in step S26. For example, the chain 30 may be switched from sprocket 32c to sprocket 32d to make a switch from third to fourth gear. It is then determined in step S27 whether the shifting operation has been completed. This step ensures that the previous shifting operation has completed before allowing the output of another shift command in the event that the upshifting switch 22a or the downshifting switch 22b is actuated in a continuous manner. If this were not done, then repeated upshifting may occur in the subsequent performance of step S23 before the previous cycle of shifting is completed, thus creating considerable shift shock and other problems such as misalignment of the shifting teeth with the chain.

Completion of a shifting cycle may be established, for example, by sensing the rpm of the front wheel 14 (or rear wheel 15) on the basis of the number of pulses output by the speed sensor 42b of the speed sensing unit 42. In this embodiment, a shifting cycle may be considered complete after two wheel revolutions as described above, and this may be determined by confirming that nine pulses (4 (number of sensing elements)×2 (revolutions)+1), for example, have been generated by the four speed sensing elements 42a moving past the speed sensor 42b. Processing continues at step S24 once the shift cycle is completed.

If it is determined in step S24 that the downshifting switch 23a was actuated, it is then determined in step S28 whether the shift position SH is already at "1," thus making further downshifting impossible. If so, then the operation returns to the main routine. Otherwise, a shift signal is sent to the rear derailleur 33, the actuator of the rear derailleur 33 is set in motion, and the shift position is moved one step down in step S29. For example, the chain 30 may be switched from sprocket 32d to sprocket 32c to make a switch from fourth to third gear. It is then determined in step S30 whether the shifting operation has been completed. The determination procedure is the same as in step S27. Once the shifting operation has been completed, or if the downshifting switch 23a was not actuated, processing returns to the main routine.

Figure 9:
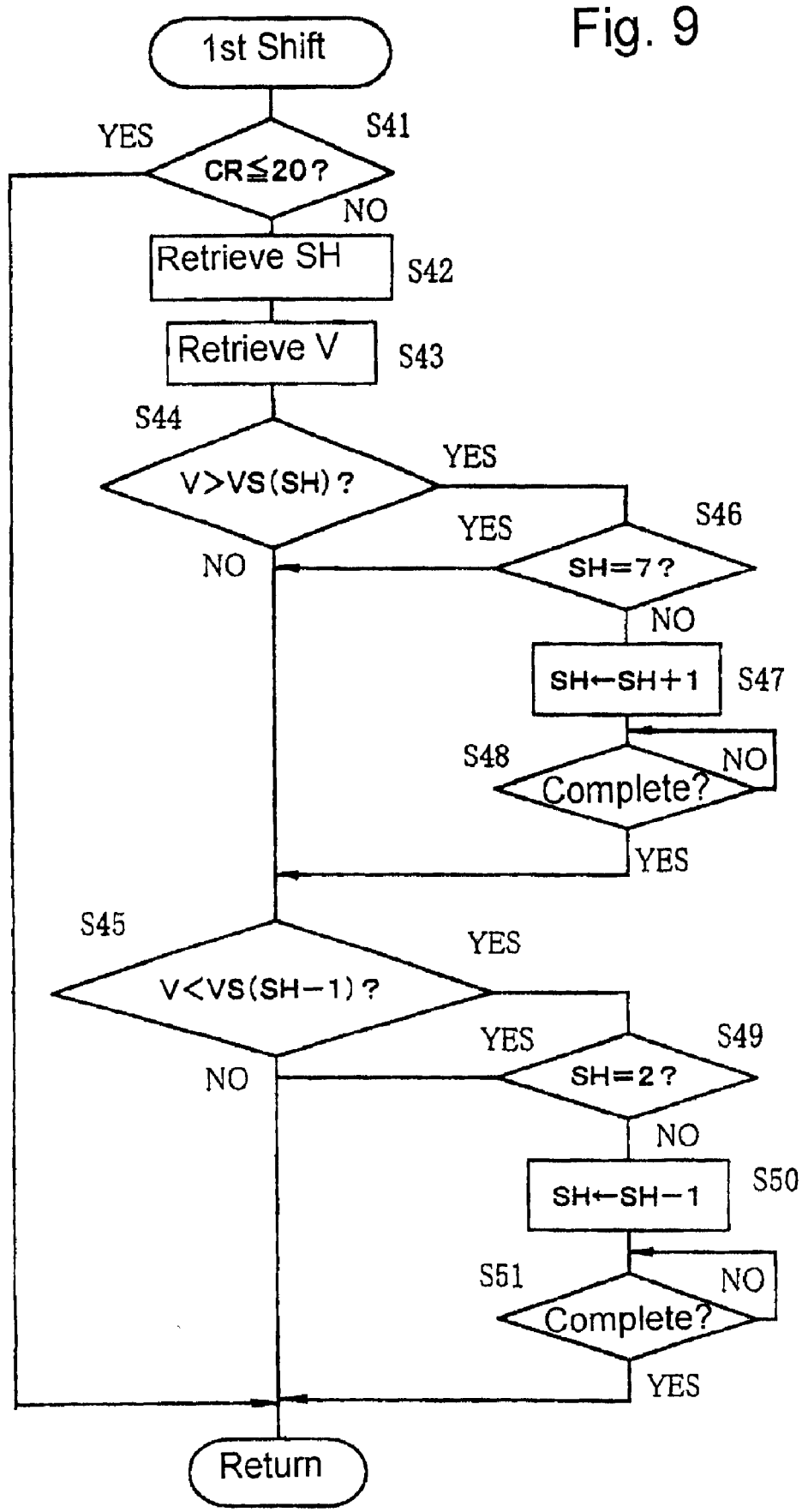
FIG. 9 is a flowchart of a particular embodiment of an automatic shifting routine executed by the shift control device shown in FIG. 6.

FIG. 9 is a flowchart of a particular embodiment of a first (automatic) shifting procedure represented by step S9 in FIG. 7. It is first determined in step S41 whether the crank arm rotational speed CR is at or below 20 rpm in the same manner as in step S21 in FIG. 8. If so, the system returns to the main routine without performing any procedures since, as noted previously, gears are difficult to shift when the crank arms 24 and 25 rotate at a low speed. Otherwise, the data concerning the current shift position SH are retrieved from the shift position sensors provided to the rear derailleur 33 in step S42, and the data concerning the current velocity V are retrieved based on the signals provided by the speed sensing unit 42 in step S43.

It is then determined in step S44 whether the current velocity V exceeds the velocity VS (SH) established for that shift position SH. This determination procedure is aimed at determining whether any upshifting is needed. If so, it is determined in step S46 whether the shift position SH is at "7." This type of first shifting mode is used only up to the seventh speed, so this step is performed in order to prevent the shift position from exceeding the seventh gear. The operation proceeds to step S45 if the seventh gear is already engaged. Otherwise, an upshift signal is sent to the rear derailleur 33, the actuator of the rear derailleur 33 is set in motion, and the shift position is moved one step up in step S47. More specifically, the gears are upshifted from sprocket 32*b* to sprocket 32*c*, from sprocket 32*c* to sprocket 32*d*, from sprocket 32*d* to sprocket 32*e*, from sprocket 32*e* to sprocket 32*f*, or from sprocket 32*f* to sprocket 32*g* when the following levels are exceeded: VS(2)=9 km/h, VS(3)=13 km/h, VS(4)= 17 km/h, VS(5)=21 km/h, and VS(6)=25 km/h, respectively.

It is determined in step S48 whether the shifting operation has been completed. This step ensures that the previous shifting operation has completed before allowing the output of another shift command in the event that the bicycle is accelerating very rapidly. If this were not done, then repeated upshifting may occur in the subsequent performance of step S44 before the previous cycle of shifting is completed, thus creating considerable shift shock and other problems noted above.

Completion of a shifting cycle may be established, for example, by sensing the number of revolutions of the front wheel 14 (or rear wheel 15) on the basis of the number of pulses output by the speed sensor 42*b* of the speed sensing unit 42 in the same manner as in the case of manual shifting. That is, a shifting cycle may be considered completed after two wheel revolutions (confirmed by the detection of nine pulses) as described above. The operation proceeds to step S45 once the shifting cycle is completed.

The chattering normally occurring in the vicinity of the velocity VS in automatic shifting mode can be prevented because waiting for the shifting cycle to complete makes it possible to prevent further shifting until the speed is stabilized. More specifically, downshifting or upshifting to the previous gear tends to be repeated because of minute speed variations in the vicinity of velocity VS, but because the system inhibits further shifting until the shifting cycle is completed, it is possible to ensure that the velocity V has a chance to move further away from the shift velocity VS, thus stabilizing the system.

It is determined in step S45 whether the current velocity V is less than the velocity VS (SH-1) established in accordance with a shift position SH-1. This determination procedure is aimed at determining whether any downshifting is needed. If so, it is determined in step S49 whether the shift position SH is at "2." This type of first shifting mode is used only down to the second speed, so this determination procedure is performed in order to prevent the shift position from dropping below the second gear. The operation returns to the main routine if the second gear is already engaged. Otherwise, a downshift signal is sent to the rear derailleur 33, the actuator of the rear derailleur 33 is set in motion, and the shift position is moved one step down in step S50. For example, the chain 30 may be switched from sprocket 32*e* to sprocket 32*d* to make a switch from fourth to third gear. In step S51, completion of the shifting cycle is awaited in the same manner as in the case of upshifting. Performing downshifting in this manner makes it less likely that the gears will be downshifted across a plurality of speed steps all at once and that rough shifting accompanied by shocks will occur when the speed drops precipitously such as during abrupt braking. It is also possible to prevent chattering during downshifting. The system returns to the main routine when it is concluded that shifting has been completed.

The second and third shifting procedures involve the same basic operations as the first shifting procedure. Specifically, the values of the velocity VS are merely shifted one at a time in the direction of lower or higher speeds, and the shifting ranges are merely shifted from the first gear to the sixth gear or from the third gear to the eights gear. Consequently, only the determination procedures of steps S44, S45, S46, and S49 in FIG. 9 are different, with the rest involving the same operations.

While the above is a description of various embodiments of the present invention, further modifications may be employed without departing from the spirit and scope of the present invention. For example, although the above embodiment was described with reference to a case in which the completion of a shifting cycle was determined based on the rpm of a wheel because the rpm of the wheel and the rpm of the rear sprockets were equal to each other during pedal propulsion, an approach in which the completion of a shifting cycle is confirmed based on the rpm of a crank arm can also be adopted because the rear sprockets sometimes rotate slower than the wheels. It is possible, for example, to adopt an approach in which the system waits until the crank arms 24 and 25 perform one revolution or rotate through 1.5 or more turns. The wheels often perform two or more revolutions every time the crank arms 24 and 25 perform about 1.5 or more revolutions because bicycle crank arms usually rotate slower than bicycle wheels. The crank arm rpm is therefore determined at a lower level than is the wheel rpm.

Completion of shifting may also be confirmed at regular intervals or during shift periods selected in accordance with an elapsed standby time. The standby time may be set to 2.8 s (maximum time needed to complete shifting in this embodiment) because shifting is fully completed in two wheel revolutions during pedal propulsion, as described above. The chain 30 is often looped around the sprockets 32*a*–32*c* at a low speed. The three large sprockets 32*a*–32*c* have two shifting teeth, allowing a shifting cycle to be completed in half the time (about 1.4 s). Although the time needed to complete a shifting cycle in this manner varies with bicycle speed, the shifting cycle is commonly completed within a maximum time of 1.4 s at a speed of 10 km/h or greater, allowing completion of shifting to be confirmed by allowing a certain standby time (for example, 1.4 s) to elapse. The same standby time can be used both for upshifting and for downshifting. Of course, this time may change depending upon the bicycle configuration. The standby time may also be varied in accordance with bicycle speed. For example, the standby time can be set to 1.4 s at a low speed (10 km/h or less), 1.0 s at an intermediate speed (over 10 km/h and up to 20 km/h), and 0.7 s at a speed in excess of 20 km/h. The same standby time can be used both for upshifting and for downshifting.

Although the above embodiment was described with reference to an automatic shifting mode for the derailleur 33, the present invention can also be applied to cases in which gears are automatically shifted with the front derailleur 27 as well. Furthermore, although the above embodiment was described with reference to an externally mounted shifting device, the present invention is also applicable to internally mounted shifting devices. An internally mounted shifting device also experiences considerable shock when gears are abruptly shifted during acceleration or deceleration. Another feature of an internally mounted shifting device is that shifting is impaired when the crank arms are rotated and a torque is transmitted to the internally mounted shifting device. It is therefore possible to adopt a reverse arrangement in relation to the above embodiment; that is, to output a shift signal when the crank arms stop or rotate at or below a specific speed.

Although the above embodiment was described with reference to a case in which gears were automatically shifted using six out of eight rear sprocket wheels 32, it is also possible to shift the gears automatically by employing seven or five sprockets. Another alternative is to use all eight sprockets for automatic shifting.

The size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle shift control device comprising:
a shift signal output unit for outputting shift signals; and
an inhibiting unit operatively coupled to the shift signal output unit for inhibiting the output of a second shift signal after the output of a first shift signal regardless of whether the first shift signal corresponded to a shifting direction that is the same as or different from a shifting direction corresponding to the second shift signal.

2. The device according to claim 1 wherein the inhibiting unit inhibits the output of the second shift signal for a predetermined standby time after the output of the first shift signal.

3. The device according to claim 2 wherein the predetermined standby time is constant for each shift signal.

4. The device according to claim 2 wherein the predetermined standby time comprises:
a first constant time for each shifting signal indicating an upshift;
a second constant time for each shifting signal indicating a downshift; and
wherein the first constant time is different from the second constant time.

5. The device according to claim 2 wherein the predetermined standby time is variable for each shift signal.

6. The device according to claim 5 wherein the predetermined standby time comprises:
a first variable time for each shifting signal indicating an upshift;
a second variable time for each shifting signal indicating a downshift; and
wherein the first variable time is different from the second variable time.

7. The device according to claim 1 further comprising a speed sensing unit operatively coupled to the shift signal output unit for sensing bicycle speed, wherein the shift signal output unit outputs shift signals in response to signals received from the speed sensing unit.

8. The device according to claim 7 wherein the inhibiting unit inhibits the output of the second shift signal for a predetermined standby time after the output of the first shift signal.

9. The device according to claim 8 wherein the predetermined standby time is constant for each shift signal.

10. The device according to claim 8 wherein the predetermined standby time comprises:
a first constant time for each shifting signal indicating an upshift;
a second constant time for each shifting signal indicating a downshift; and
wherein the first constant time is different from the second constant time.

11. The device according to claim 8 wherein the predetermined standby time is a function of the sensed bicycle speed.

12. The device according to claim 11 wherein the predetermined time decreases as the sensed bicycle speed increases.

13. The device according to claim 8 wherein the predetermined standby time is variable for each shift signal.

14. The device according to claim 13 wherein the predetermined standby time comprises:
a first variable time for each shifting signal indicating an upshift;
a second variable time for each shifting signal indicating a downshift; and
wherein the first variable time is different from the second variable time.

15. The device according to claim 1 further comprising a revolution sensing unit operatively coupled to the shift signal output unit for sensing revolution of a bicycle component, wherein the shift signal output unit outputs shift signals in response to signals received from the revolution sensing unit.

16. The device according to claim 15 wherein the revolution sensing unit is operatively coupled to the inhibiting unit, and wherein the inhibiting unit inhibits the output of the second shift signal until the revolution sensing unit senses at least one revolution of the bicycle component after the output of the first shift signal.

17. The device according to claim 15 wherein the revolution sensing unit comprises a wheel revolution sensing unit.

18. The device according to claim 17 wherein the wheel revolution sensing unit is operatively coupled to the inhibiting unit, and wherein the inhibiting unit inhibits the output of the second shift signal until the wheel revolution sensing unit senses at least one revolution of a wheel after the output of the first shift signal.

19. The device according to claim 18 wherein the wheel revolution sensing unit comprises a plurality of sensing elements adapted to be circumferentially disposed on the bicycle wheel.

20. The device according to claim 15 wherein the revolution sensing unit comprises a crank arm revolution sensing unit.

21. The device according to claim 20 wherein the crank arm revolution sensing unit is operatively coupled to the inhibiting unit, and wherein the inhibiting unit inhibits the output of the second shift signal until the crank arm revolution sensing unit senses at least one revolution of a crank arm after the output of the first shift signal.

22. The device according to claim 1 further comprising a crank arm speed sensing unit operatively coupled to the inhibiting unit, wherein the inhibiting unit inhibits the output of the second shift signal for as long as a sensed crank arm speed is below a predetermined value.

23. The device according to claim 1 further comprising a crank arm speed sensing unit operatively coupled to the inhibiting unit, wherein the inhibiting unit inhibits the output of the second shift signal for as long as a sensed crank arm speed is above a predetermined value.

24. The device according to claim 1 further comprising a manually operated shift operating device operatively coupled to the shift signal output unit, wherein the shift signal output unit outputs shift signals in response to manipulation of the shift operating device.

* * * * *